Jan. 9, 1962 J. V. GILIBERTY 3,015,937
TEMPERATURE MODULATING SYSTEM FOR INTERNAL
COMBUSTION TURBINES AND THE LIKE
Filed July 3, 1958 3 Sheets-Sheet 1

INVENTOR.
JAMES V. GILIBERTY
BY
Louis B. Applebaum
ATTORNEYS

INVENTOR.
JAMES V. GILIBERTY
BY
Louis B. Appleton
ATTORNEYS

Jan. 9, 1962 J. V. GILIBERTY 3,015,937
TEMPERATURE MODULATING SYSTEM FOR INTERNAL
COMBUSTION TURBINES AND THE LIKE
Filed July 3, 1958 3 Sheets-Sheet 3

INVENTOR.
JAMES V. GILIBERTY
BY
*Louis B. Applebaum*
ATTORNEYS

United States Patent Office 3,015,937
Patented Jan. 9, 1962

3,015,937
TEMPERATURE MODULATING SYSTEM FOR INTERNAL COMBUSTION TURBINES AND THE LIKE
James V. Giliberty, 26 Woodview Road, West Hempstead, N.Y.
Filed July 3, 1958, Ser. No. 746,570
2 Claims. (Cl. 60—39.66)
(Granted under Title 35, U.S. Code (1952), sec. 266)

The invention described herein may be manufactured and used by or for the Government of the United States of America for governmental purposes without the payment of any royalties thereon or therefor.

This invention pertains to the art of internal combustion turbines, and comprises a temperature modulating system which controls temperature differential between the several components of the turbine engine, and thereby attains more uniform temperature throughout the engine. The invention operates to inhibit thermal deterioration of engine components, and also increases thermal efficiency of the engine.

This application is a continuation-in-part of my copending application Serial No. 599,277, filed July 20, 1956, now abandoned.

In practice of the present invention, directed to turbine structure comprising circles of turbine blades, fluid coolant that flows through blade ducts to inhibit thermal deterioration of the material of the blades flows in succession through blades that rotate and stator blades. The fluid coolant consists of atmospheric air, which is taken from the atmosphere that is outside the engine.

A jacket around the outside of the engine contains a fluid coolant around the turbine and the combustion chamber, where fuel in gaseous form is in process of combustion, and the jacket constitutes a barrier of insulation to inhibit heat loss from the engine to the outside atmosphere. Air that flows through turbine blade ducts, and absorbs heat therefrom, is directed to flow through the insulating jacket, and inhibits thermal deterioration of the material of the turbine and the combustion chamber adjacent to the jacket.

The fluid passage of the jacket communicates with the air intake of the combustion chamber, and the heat that is absorbed by air constituting the fluid coolant enters the combustion chamber, and is not lost to the engine. An air compressor that is provided supplies air to the combustion chamber through its intake. The heated air from the insulating jacket mixes with the air intake from the compressor to supply pre-heated air to the combustion chamber, and this improves the process of combustion.

A practical embodiment of the invention is disclosed in the accompanying drawings, in which FIG. 1 is a side elevation, in half-section along its axial plane, of a turbine engine embodying the present invention;

Figure 1:
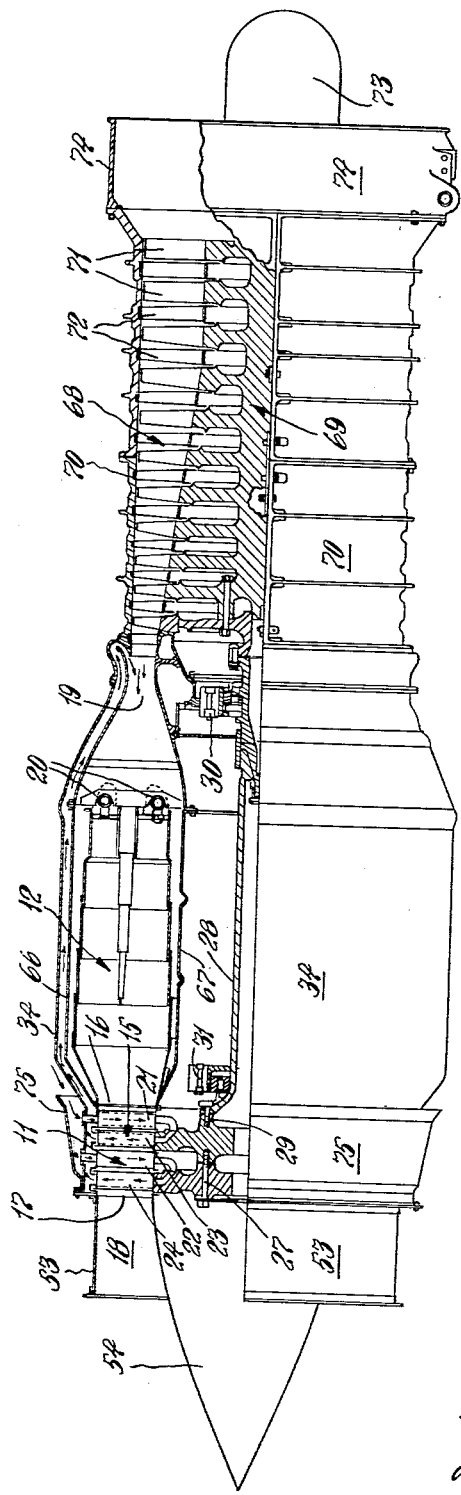

The turbine engine of FIG. 1 comprises the turbine 11, which receives fuel in process of combustion from combustion chamber 12.

Turbine 11 constitutes an annular fluid passage 15, in which fuel in process of combustion flows from its inlet 16 to and through its outlet 17 and into exhaust 18. Combustion chamber 12 is secured to turbine 11 at its inlet 16 from which it extends to air intake 19 of the combustion chamber constituting an annular throat. Fuel enters combustion chamber 12 by means of injectors 20, is ignited, mixing with air from intake 19, and the burning gases flow into turbine passage 15 through inlet 16.

Turbine 11 comprises coaxial circles of stationary blades 21 and 22 and rotary blades 23 and 24 which are arranged in succession along turbine passage 15 in alternating circles of stationary and rotary blades. Circles of stationary blades 21 and rotary blades 23 constitute a first expansion stage of turbine 11, which is followed by the second stage of the circles of stationary blades 22 and rotary blades 24. Expansion of gases in the process of combustion along turbine passage 15 drive the circles of rotary blades 23 and 24, in a rotation respective to their adjacent circles of stationary blades 21 and 22.

Figure 2:
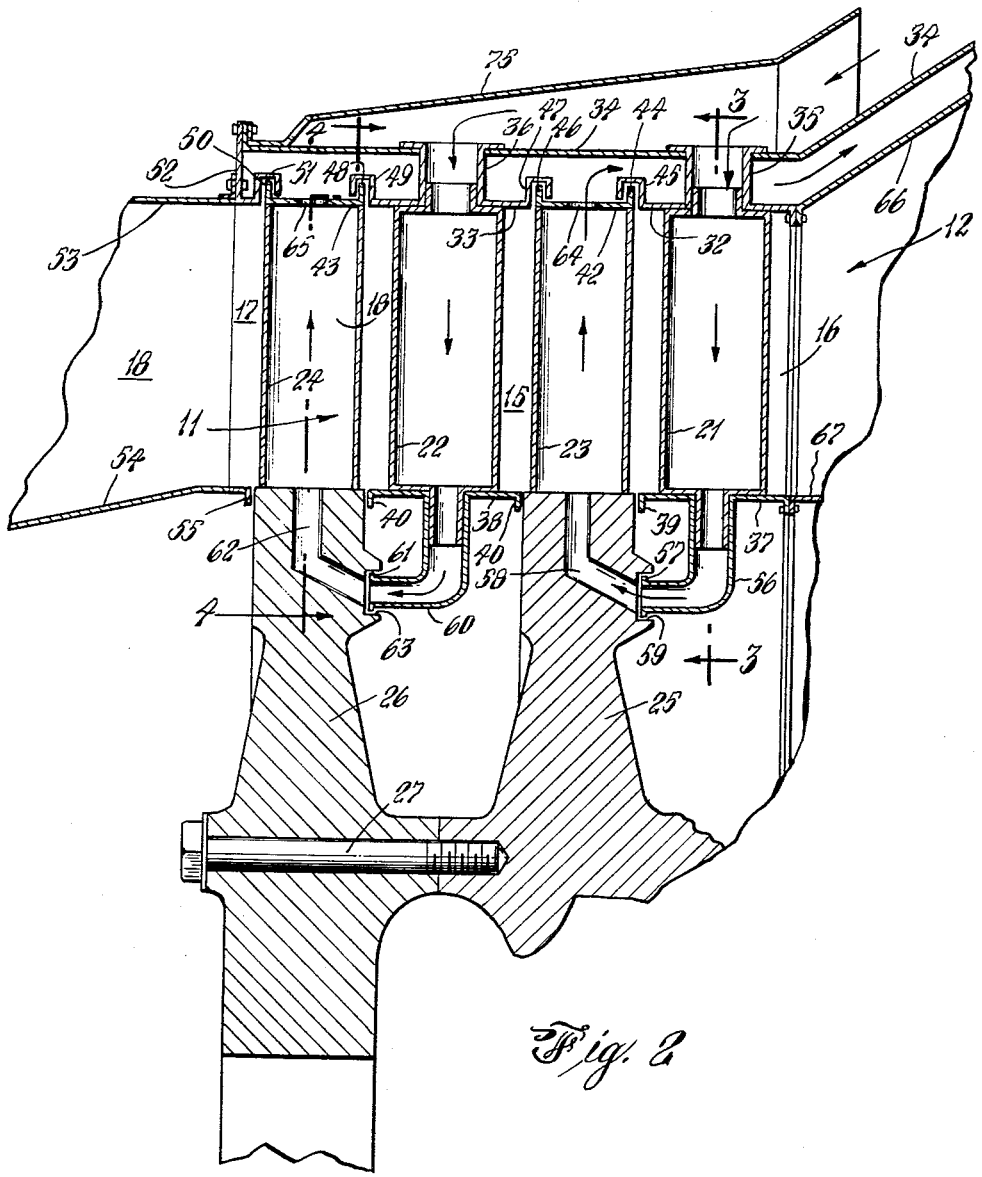
FIG. 2 is a detail, in axial cross section, of the turbine of the engine of FIG. 1.
Figure 4:
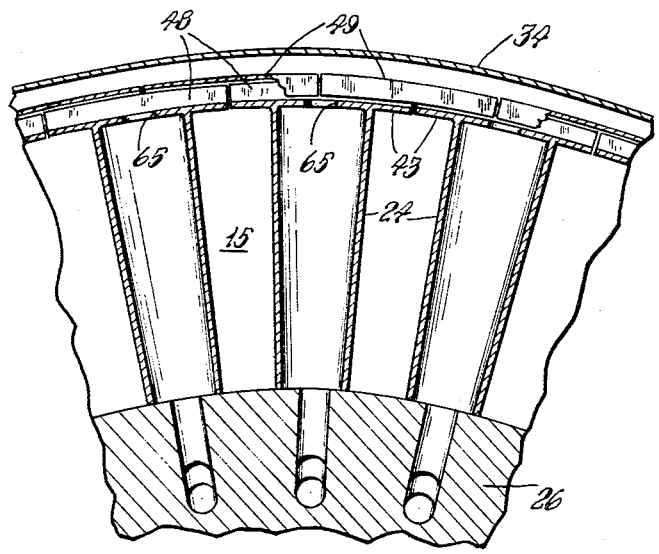
FIG. 4 is a transverse cross-sectional elevation, taken on line 4—4 of FIG. 2.

Rotary blades 23 are mounted on the outer periphery of hub 25, projecting radially outwardly and at intervals circumferentially, and rotary blades 24 are mounted similarly on the outer periphery of hub 26, also projecting radially outwardly and at intervals circumferentially, as seen in FIGS. 1, 2 and 4. Hubs 25 and 26 are secured to each other rigidly by means of screws 27, and are secured to shaft 28, FIG. 1, by means of screws 29. The rotor, comprising hubs 25 and 26 carrying blades 23 and 24, respectively, and the shaft 28, rotates as a unit in bearings 30 and 31, fore and aft, respectively.

Figure 3:
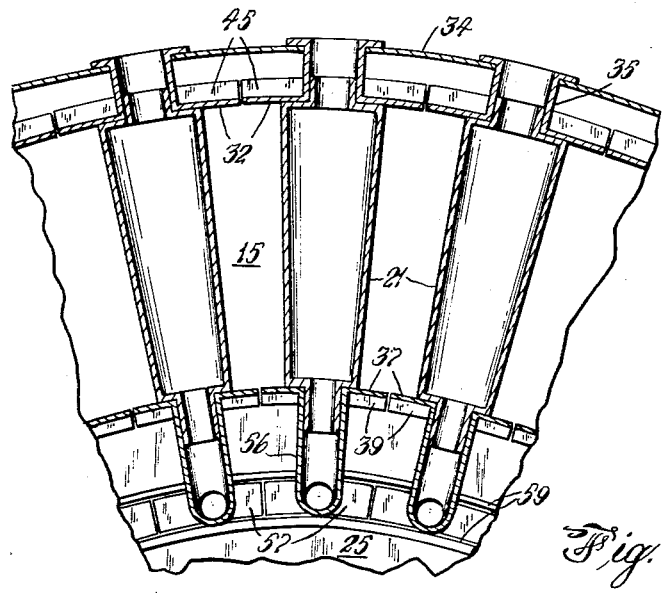
FIG. 3 is a transverse cross-sectional elevation, taken on line 3—3 of FIG. 2.

Stationary blades 21 are secured each at its outer end to a segment 32, to project radially inwardly therefrom, as seen in FIGS. 2 and 3. The several segments 32 abut each other end-to-end to form a continuous circular band and to constitute a container element, which is a stationary portion of the outer container of turbine passage 15, and supports blades 21 at intervals circumferentially. In like structure, stationary blades 22 are secured each at its outer end to a segment 33, the several segments abutting each other end-to-end to form a continuous band constituting a circular container element, which is another stationary portion of the outer container of turbine passage 15. The circle of segments 33 also support stationary blades 22 at circumferential intervals, and the blades project radially inwardly from their container element of segments 33 in a circle of blades between the circles of rotary blades 23 and 24.

Each turbine blade 21, 22, 23 and 24 constitutes a fluid duct that extends lengthwise from end to end of the blade.

Casing 34 is positioned around turbine 11, and is spaced away from the outer container of turbine passage 15 embodying the container elements of segments 32 and 33. At the outer end of each stationary blade 21, and secured thereto with its segment 32, communicating duct 35 is connected with the tube duct, and is secured at its outer end to casing 34 in communication with the atmosphere outside the turbine engine, as seen in FIGS. 2 and 3. In like structure, a communicating duct 36 secures each stationary blade 22 to stationary casing 34, and provides a fluid passage between the blade duct and the outside atmosphere, positioning the circle of stationary blades 22 between the circles of rotary blades 23 and 24.

At its inner end, as seen in FIGS. 2 and 3, each stationary blade 21 is secured to a segment 37, and the several segments abut each other end-to-end to form a continuous circular band, which constitutes an inner container element of turbine passage 15. In like structure, an inner container element consists of segments 38, which are secured each to a stationary blade 22.

Each segment 37 comprises a flange 39 along its edge adjacent to hub 25, FIG. 2, the flange being continuous in the several segments constituting the annular inner container element of the circle of stationary blades 21, and being closely adjacent to but out of contact with relatively rotatable hub 25. In similar structure, each of opposite edges of each segment 38 comprises respective flanges 40 and 41, each flange being continuous in the several segments constituting the inner container element of stationary blades 22. Flange 40 is closely adjacent to but out of contact with adjacent relatively rotatable hub 25, and flange 41 is closely adjacent to but out of contact with relatively rotatable hub 26. Thus, hub 25 between the inner container elements of segments 37, and the inner container element of segments 38 between rotatable hubs 25 and 26, constitute a continuous inner container of turbine passage 15, with alternate portions thereof being stationary and rotatable. Fluid draft being along turbine passage 15, flow through any space that exists between stationary inner container elements of segments 37 and 38 and the rotary hubs 25 and 26 tends towards turbine passage 15, and this would add air to the gases that are burning in the turbine passage instead of permitting the gases to escape. Material of turbine 11 expands as the engine approaches operating temperature, reducing any space between adjacent components that rotate relatively, whereby any air leakage into the turbine passage 15 is slight.

Each rotary blade 23 comprises a segment 42 secured at its outer end, and a segment 43 is secured at the outer end of each rotary blade 24. As seen in FIG. 4, segments 43 abut each other end-to-end, forming a continuous circular band around the circle of rotary blades 24 at their outer ends. In like structure, a continuous circular band is formed around the circle of rotary blades 23 at their outer ends from segments 42 abutting each other end-to-end.

Along one of the edges of segments 42, flanges 44 constitute a continuous circular flange which rotates in the circular groove 45 that is formed continuously in the several segments 32, and any suitable fluid seal is provided between the stationary circular groove and the relatively rotatable flange that it contains. Flanges 46 along the other of the edges of segments 42 constitutes a continuous circular flange which rotates in continuous circular groove 47, which is formed in the several segments 33 constituting the outer container element of the circle of blades 22. Carried by the circle of rotary blades 24, continuous flange 48 rotates in annular groove 49, and flange 50 rotates in annular groove 51, at respective opposite edges of the circular band of segments 43. Groove 49 is formed in segments 33 of the circle of stationary blades 22, and along the edges thereof opposite groove 47. Groove 51 is formed in plate 52. Suitable fluid seals are embodied in each groove 49 and 51 also. A continuous outer container of turbine passage 15 is constituted in the rotary container elements of segments 42 and 43 alternating between stationary container elements of segments 32 and 33 and the plate 52, a suitable seal being provided between relatively rotating portions of the outer container embodied in the several annular grooves 45, 47, 49 and 51.

Plate 52 is secured at the end of casing 34 that is located at outlet 17 of turbine passage 15, and constitutes an end closure for the space between the outer container, consisting of segments 32, 42, 33, 43 and 55 in succession, and the outside casing 34.

Duct 53 is secured to plate 52 at the circumference of the outer container of turbine passage 15, to constitute exhaust 18, of which tail cone 54 is the inner container secured at the circumference of the inner container of the turbine passage, thereby constituting exhaust 18 an annular passage which is continuous with the annular turbine passage 15. Tail cone 54 constitutes flange 55, which is positioned closely adjacent to but out of contact with rotary hub 26, and serves the same purpose as flanges 39, 40 and 41 to contain the gases in process of combustion against escape and within the continuous annular passage of turbine passage 15 and exhaust 18.

Of the inner container element of the circle of stationary blades 21, each segment 37 comprises a communicating duct 56 connected with the duct of its blade 21. At its opposite end, each communicating duct 56 comprises a segment 57, and the several segments 57 abut each other end-to-end to constitute a circular plate, which is stationary. A duct 58 through hub 25 connects each blade 23 with a circular groove 59 in the side face of the hub, and groove 59 rotates relative to the plate of segments 57. The circular plate of segments 57 is positioned inside groove 59, with its face closely adjacent to but out of contact with the base face of the groove. The structure of closely registering faces of the circular plate of segments 57 and the circular groove 59 enables fluid flow from duct to duct of blades of circles of blades 21 and 23, and the plate of segments 57 being inside groove 59 inhibits escape of the flowing fluid from its path between rotating and stationary turbine blades. In like structure of the second turbine stage, consisting of rotating and stationary circles of blades 24 and 22, each segment 38 comprises a communicating duct 60 connected with the duct of its blade 22, and terminating with segment 61 constituting a continuous circular plate in the several segments. Each rotary blade 24 is connected by duct 62 through hub 26 with circular groove 63 in the side face of the hub. The stationary circular plate of segments 61 is positioned in rotary circular groove 63, the structure being the same as circular plate of segments 57 in groove 59, as described hereinbefore, and for the same purpose.

At the outer end of each rotary blade 23, segment 42 comprises a port 64 which connects the duct of the blade with the space outside the outer container of turbine passage 15, and this determines the direction of fluid flow through ducts of turbine blades 21 and 23 in succession. A like port 65 through each segment 43 of a blade 24 directs fluid flow through ducts of turbine blades 22 and 24 in succession.

As seen in FIG. 1, combustion chamber 12 comprises outer casing 66 and inner casing 67, whereby the combustion chamber constitutes an annular passage of fluid communicating with inlet 16 of turbine passage 15. Outer casing 66 is attached to the circle of segments 32 at its circumference of the outer container of turbine passage 15, and inner casing 67 is attached at the circumference of the inner container of the turbine passage to the circle of segments 37. Outer and inner casings 66 and 67 approach each other at intake 19 to constitute a smoothly contoured intake throat for air flowing into combustion chamber 12.

The engine of turbine 11 comprises a coaxial compressor 68, consisting of rotor 69 and stator 70. Rotor 69 is secured rigidly to shaft 28 and rotates therewith and with the turbine rotor embodying hubs 25 and 26 supporting rotary blades 23 and 24, respectively. Circles of rotary blades 71 are secured to rotor 69 in succession along compressor 68. Stator 70 comprises a casing, to which circles of stationary blades 72 are secured to project radially inwardly at intervals between circles of stationary blades 71. Each set of a circle of rotary blades 71 and an adjacent circle of stationary blades constitutes a compression stage of compressor 68.

Nose piece 73 at the front end of the engine, located at the center of casing 74, constitutes an annular intake for the engine which supplies atmospheric air to compressor 68. Successive stages of adjacent circles of rotary blades 71 and stationary blades 72 compress the air, and also heat it, and exhausts the air in preheated condition into combustion chamber 12 through its intake 19.

Casing 34 is extended forwardly from turbine 11 around outer casing 66 of combustion chamber 12 to and around its end, and air is drawn into combustion chamber 12 through its intake 19 from the space between outside casing 34 and outer casing 66. Cowl 75, attached to outside casing 34 at end plate 52, directs atmospheric air from outside the engine into communicating ducts 35 and 36 and through stationary blades 21 and 22. Air entering intake 19 from the space between outside casing 34 and outer casing 66 is drawn from rotary blades 23 and 24 through their respective ports 64 and 65. The air flows from stationary blades 21 to rotary blades 23 in succession through their respective ducts 56 and 58, and from stationary blades 24 to rotary blades 23 in succession through their respective ducts 60 and 62.

Atmospheric air that flows through blades 21 and 23 in succession, and through blades 23 and 24 in succession, absorbs heat from the blades and modulates the temperature of the blades, thereby inhibiting thermal deterioration of the blades. This air flowing through outside casing 34 and around the outside of turbine passage 15 and combustion chamber 12 forms a heat exchange barrier or insulating jacket which inhibits loss of heat from the engine. Heat that the air absorbs as it flows through blades 21, 23, 22 and 24 is not lost, but enters combustion chamber 12 through its intake 19, and the air from the jacket in preheated conditions mixes with the preheated air from compressor 68 as air supply for combustion.

A practical embodiment of the invention is disclosed. Scope of the invention is determined by the accompanying claims.

I claim:

1. A gas turbine comprising a casing, a combustion chamber having an upstream end and a downstream end, said chamber being secured in said casing, a turbine having hollow turbine blades carried in said casing, said turbine being in flow series with the downstream end of said combustion chamber, a compressor having a discharge end in flow series with the upstream end of said combustion chamber, a cowl secured to said casing proximate said turbine blades, and a conduit defined by said combustion chamber and said casing, said cowl and said hollow blades and said conduit forming a passageway for atmospheric air through said cowl, then through said hollow blades, then through said conduit and then into said combustion chamber at the upstream end of said combustion chamber proximate the discharge end of said compressor, whereby the discharge from said compressor serves as a pumping means for said atmospheric air.

2. The combination of claim 1 in which the upstream end of said combustion chamber constitutes an annular throat.

References Cited in the file of this patent

UNITED STATES PATENTS

| | | |
|---|---|---|
| 2,333,053 | Stroehlen | Oct. 26, 1943 |
| 2,440,069 | Bloomberg | Apr. 20, 1948 |
| 2,445,837 | McKenzie | July 27, 1948 |
| 2,611,241 | Schulz | Sept. 23, 1952 |
| 2,618,120 | Papini | Nov. 18, 1952 |
| 2,640,315 | Secord | June 2, 1953 |
| 2,826,895 | English | Mar. 18, 1958 |
| 2,896,906 | Durkin | July 28, 1959 |
| 2,940,257 | Eckert et al. | June 14, 1960 |

FOREIGN PATENTS

| | | |
|---|---|---|
| 1,097,374 | France | Feb. 16, 1955 |